United States Patent
Moriyama

(10) Patent No.: US 7,196,689 B2
(45) Date of Patent: Mar. 27, 2007

(54) INFORMATION DEVICE

(75) Inventor: Takashi Moriyama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 481 days.

(21) Appl. No.: 10/812,552

(22) Filed: Mar. 29, 2004

(65) Prior Publication Data

US 2004/0212588 A1    Oct. 28, 2004

(30) Foreign Application Priority Data

Mar. 31, 2003    (JP)    ............... 2003/094815

(51) Int. Cl.
*G09G 5/00*    (2006.01)
(52) U.S. Cl. .................... 345/156; 345/173
(58) Field of Classification Search ................ 345/156, 345/173, 174, 901, 158; 715/864
See application file for complete search history.

(56) References Cited

U.S. PATENT DOCUMENTS 5,724,064 A    3/1998    Stefik et al.

2002/0167481 A1 *    11/2002    Wong et al. ................ 345/156
2005/0052471 A1 *    3/2005    Nagasaki .................... 345/649

FOREIGN PATENT DOCUMENTS

| JP | 2000-163193 A | 6/2000 |
| JP | 2002-278515 A1 | 9/2002 |
| JP | 2002-287729 A | 10/2002 |
| JP | 2003-015795 A1 | 1/2003 |

* cited by examiner

*Primary Examiner*—Ricardo Osorio
(74) *Attorney, Agent, or Firm*—Canon U.S.A. Inc. IP Division

(57) ABSTRACT

An information device including a flexible display unit capable of displaying information having page information in units of pages, a unit that detects at least one of the bending direction, the amount of bending, and the duration that the display unit is bent, and a unit that determines whether or not page scrolling has been input based on the detected at least one of the bending direction, the amount of bending, and the duration and that updates the information output on the display unit when it is determined that page scrolling has been input. The information device provides the feeling of turning pages of a traditional book.

2 Claims, 7 Drawing Sheets

INFORMATION DEVICE

BACKGROUND OF THE INVENTION

1. Field of the Invention

The present invention relates to flexible electronic paper. More specifically, the present invention relates to an information device using a plurality of sheets of electronic paper.

2. Description of the Related Art

With the recent advances made towards an information society, a larger volume of text information, image information, and audio information needs to be handled. A variety of information devices that efficiently handle such information have been developed and are commercially available. One of such information devices is an information device called an electronic book. The electronic book is capable of storing and displaying a sufficiently large volume of information as to be physically difficult to store in the form of a traditional book with sheets of paper bound.

A typical electronic book includes a display unit employing a flat panel display, such as a liquid crystal display, and an information holding unit. However, such an electronic book has the limitation that a large amount of page information must be made available on a single display. Thus, the development of easier-to-use information devices or new interfaces has advanced.

A user interface having an additional function of detecting the contact pressure, contact area, contact point, and so forth of a finger touching the display unit of an information device for page updating has been proposed.

Japanese Patent Laid-Open No. 2000-163193 discloses an information device in which it is determined whether or not page scrolling has been input based on a finger touch and the finger movement direction on a display unit such as a liquid crystal display and, if it is determined that page scrolling has been input, the image information being output on the display unit is updated to the image information on the previous or following page.

On the other hand, flexible electronic paper has attracted attention as a new device intended to realize electronic books that provide the feeling of traditional paper bound books. The main goal in the development of electronic paper is as follows:
(1) anytime, anywhere readability and writability;
(2) flexibility in updating text and images;
(3) a viewing screen that causes less visual strain to the human eye (human-eye-friendly screen);
(4) a thin and light body for portability (flexible handling); and
(5) long-term image holding without power.

The development of devices for implementing such flexible electronic paper having the features described above has advanced remarkably.

U.S. Pat. No. 5,724,064 discloses a system including a removable, flexible, induced field activated display sheet with a memory function, a housing having the function of creating appropriate induced fields for activating the sheet to produce an image, and a processor connected to the display sheet for sending image data.

A plurality of sheets of the flexible electronic paper described above are bound into an information device, hereinafter referred to as a flexible electronic book. By giving the feeling of a paper-based book, the flexible electronic book provides better usability than such an electronic book that includes a single flat panel display. However, such a flexible electronic book having a limited number of sheets of flexible electronic paper also requires an interface that allows a large volume of information to be displayed on a limited viewing area. Japanese Patent Laid-Open No. 2002-287729 shows a user interface using an acceleration sensor.

Due to the foregoing problems, there is a need for a flexible electronic book having a plurality of sheets of flexible electronic paper with improved usability in which, particularly, pages can be scrolled as naturally as possible.

SUMMARY OF THE INVENTION

According to an aspect of the present invention, an information device includes: a flexible display unit capable of displaying information having page information in units of pages; a detection unit that detects at least one of a bending direction, an amount of bending, and a duration that the display unit is bent; and a scroll determination unit that determines whether or not page scrolling has been input based on the detected at least one of the bending direction, the amount of bending, and the duration that the display unit is bent, and that updates the information output on the display unit when it is determined that page scrolling has been input.

In accordance with an aspect of the present invention, a speed at which the information is updated in the information device may be based on the amount of bending.

In accordance with another aspect of the present invention, the duration of the bending may be a duration of time for which the amount of bending exceeds a predetermined value.

In accordance with another aspect of the present invention, it may be determined that page scrolling has not been input when the bending direction is opposite a predetermined direction.

In accordance with yet another aspect of the present invention, the information may be reversely updated on the display unit when the bending direction is opposite a predetermined direction.

In accordance with yet another aspect of the present invention, the detection unit may be provided at each of two portions of the display unit.

In accordance with yet another aspect of the present invention, the detection unit may include a piezoelectric device.

In accordance with still another aspect of the present invention, the detection unit may include a piezoelectric polymer. The piezoelectric polymer may be polyvinylidene fluoride (PVDF).

In accordance with still another aspect of the present invention, the flexible display unit may display the information in a single-sided format. Alternatively, the flexible display unit may display the information in a double-sided format.

According to another aspect of the present invention, a device such as the one described above may be used for implementing a method of displaying information on electronic pages on a flexible display unit. The method comprises the following: determining page information to be displayed; displaying the page information on the flexible display unit; accepting user input; determining if the user input is a scroll request based on at least one of a bending direction, an amount of bending, and a duration that the flexible display unit is bent; if the user input is a scroll request, determining information new page information to be displayed based on the scroll request; and displaying the new page information on the flexible display unit.

Further features and advantages of the present invention will become apparent from the following description of the preferred embodiments with reference to the attached drawings.

DESCRIPTION OF THE PREFERRED EMBODIMENTS

Figure 1:
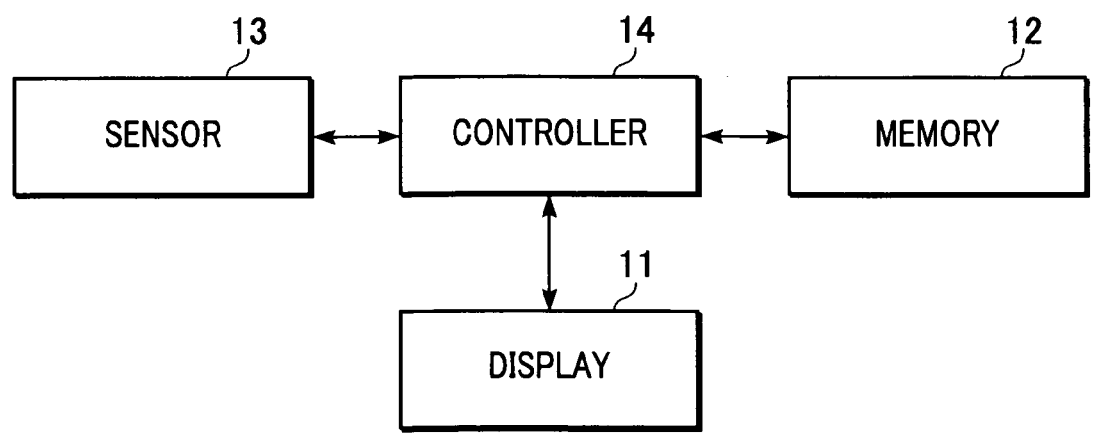
FIG. 1 is a block diagram showing an example structure of an information device of the present invention.

FIG. 1 is a block diagram showing, in the simplest manner, an information device according to an embodiment of the present invention. The information device includes a display 11, a memory 12 for information management, a detection unit (sensor) 13 that detects input information from a user, and a controller 14 for controlling these components. The display 11 may be a flexible electronic paper display. Specific examples of the display 11 include a microcapsule electrophoretic display device, a twisting ball device, a dual-frequency-driving liquid crystal device, a liquid crystal/organic light-sensor display device, a toner display, and so on. A flexible material, such as polymer, is suitable for the display device. Either electronic paper capable of single-sided display or double-sided display is possible.

The sensor 13 has the function of detecting the amount of bending of the flexible electronic paper, the duration of the bending, and so forth, which are input by a user to the flexible electronic paper. The sensor 13 may also detect the bending direction, that is, inward or outward bending, in addition to the amount of bending and the duration of the bending.

A piezoelectric device is suitable for converting the bending detected by the sensor 13 into an electrical signal. In view of placing such a pressure device on high-flexibility electronic paper, a piezoelectric polymer may be suitably employed. The following are the advantages of piezoelectric polymer:
highly flexible and less damaging;
responsive to stress; and
available in large areas.

Figure 2:
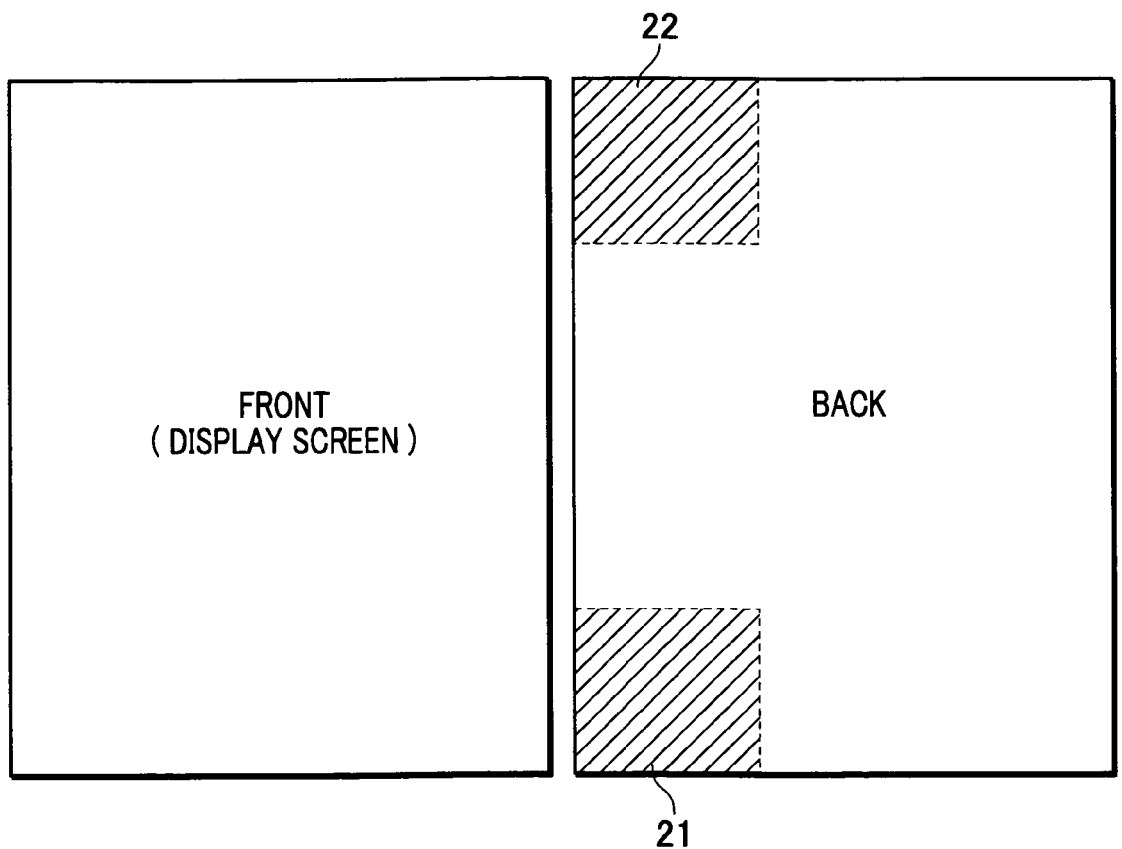
FIG. 2 is a view of a single-sided display of electronic paper of the present invention.

FIG. 2 shows flexible electronic paper having a piezoelectric device. A matrix of pixels (not shown) for displaying information in units of pages is formed on a display screen of the electronic paper. On the opposite surface, i.e., the back, piezoelectric sensors 21 and 22 are placed on the lower and upper left portions (the lower and upper right portions as viewed from the display screen), respectively. In the electronic paper, the piezoelectric sensors 21 and 22 may be located in any area on either the front or back of the paper. In order to allow a user to more naturally turn over a sheet of paper, the piezoelectric sensors 21 and 22 are preferably located at the corners of a sheet of rectangular paper.

As described above, according to the present invention, a flexible electronic book having a plurality of sheets of flexible electronic paper with improved usability in which pages can be scrolled naturally can be realized.

First Embodiment

A polyvinylidene fluoride (PVDF) material, which is a piezoelectric polymer, is processed by an extruder into sheet form, and is then reduced to a thickness of 50 μm by stretching. This stretched film undergoes a process called poling, and it is then used as a pressure sensor.

Figure 3:
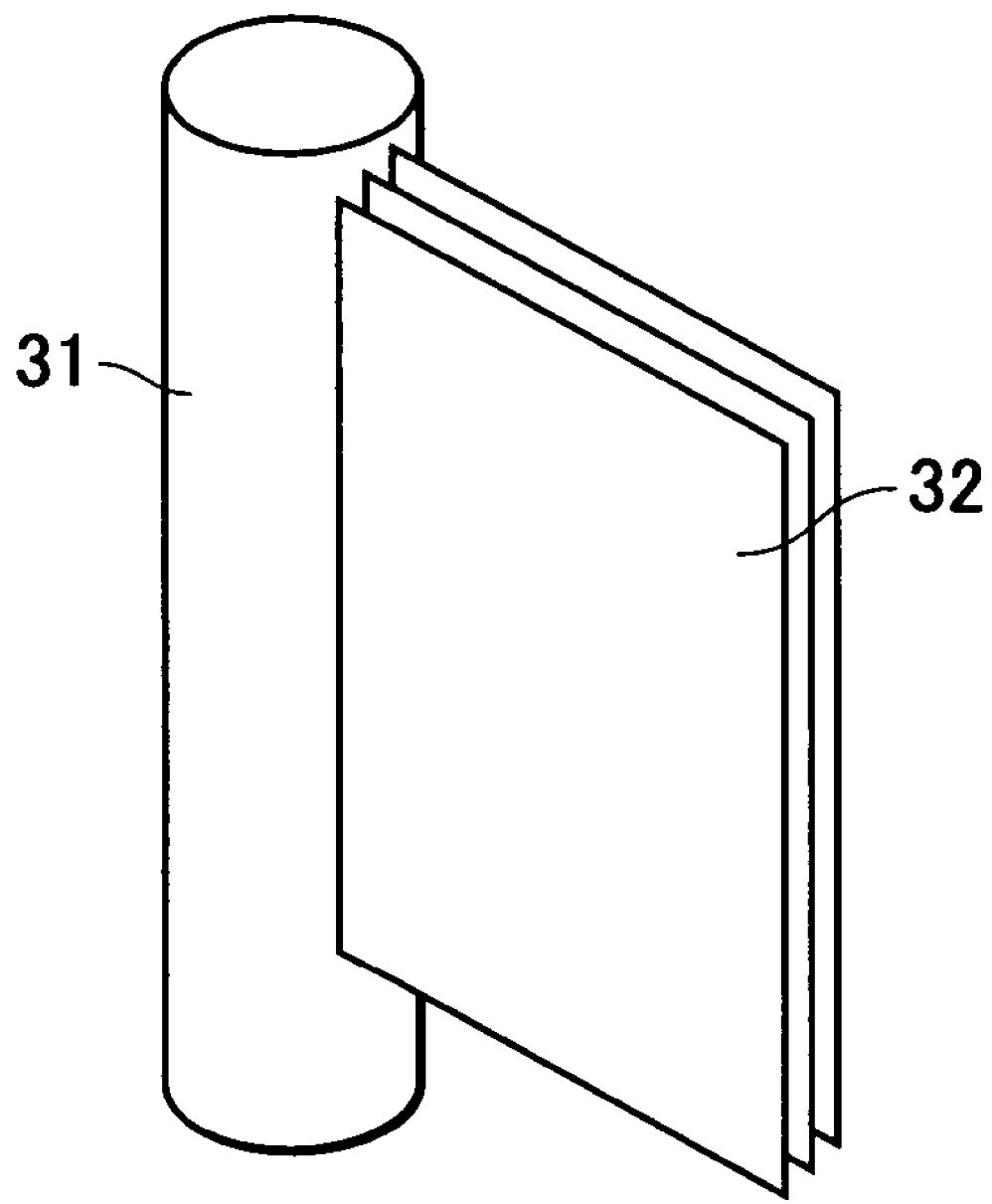
FIG. 3 is a diagram of an electronic book embodying the present invention.

The base material of the electronic paper is PET (polyethylene terephthalate) of 300 μm thickness. An ITO (indium-tin oxide) electrode is formed over the PET base material as a transparent electrode, and black and white toner particles are filled between the two layers, thereby producing toner-display electronic paper capable of black-and-white display. The pressure sensors 21 and 22 are placed at the corners on the back (non-display portion) of the toner display. Such electronic paper equipped with a pressure sensor is capable of single-sided display. A required number of sheets of such electronic paper, for example, 10 sheets of electronic paper, are bound into an electronic book by, as shown in FIG. 3, connecting a display portion (paper portion) 32 to a file portion 31. The file portion 31 houses the controller 14 and the memory 12.

The display portion 32 having pages displays information sent from the controller 14 in units of pages. The memory 12 of the file portion 31 generally contains information corresponding to ten pages or more, of which a given page and the following nine pages are displayed. Alternatively, a given page and several previous and following pages may be displayed. Like a traditional book, the page number is shown on each page in the upper or lower margin or in any of the four corners.

In a state where information having page information is shown on the electronic book, when the lower-right sensor 21 on the top page of the display portion 32 (the paper portion shown in FIG. 2) bends, a voltage corresponding to the bending direction and the amount of bending is generated in the sensor 21 and is then sent to the controller 14. As will be described in further detail below, the controller 14 determines whether or not the generated voltage is equal to a predetermined voltage or more. If it is equal to the predetermined voltage or more, the controller 14 measures the duration of the bending. When the measured duration is over a predetermined value, the controller 14 determines that page scrolling has been input. The controller 14 further determines the page updating speed based on the voltage value, and the display 11 is updated at this speed. This allows the page information to be scrolled forward.

Alternatively, it may be determined whether or not page scrolling has been input based on only the amount of bending or only the duration of the bending. Moreover, when a page is bent in the direction opposite to the direction of turning a page of a standard book, it may be determined that page scrolling has not been input.

If page numbers are shown in the same position as the sensor 21, the next page appears when the sensor 21 portion is bent, thus allowing the user to continuously scroll the pages up to the desired page while visually checking the page numbers.

A user can scroll the page information in the opposite direction by bending the sensor 22 portion. Alternatively, the page information can be scrolled in the opposite direction when a negative voltage is generated by reversely bending a sensor portion.

When each sensor portion is bent with a small bending curvature, a small value of voltage is generated, resulting in slow scrolling. On the other hand, when the bending curvature is large, a large value of voltage is generated, resulting in fast scrolling. Accordingly, a flexible electronic book having a user interface that provides realistic feeling can be realized.

Figure 5:
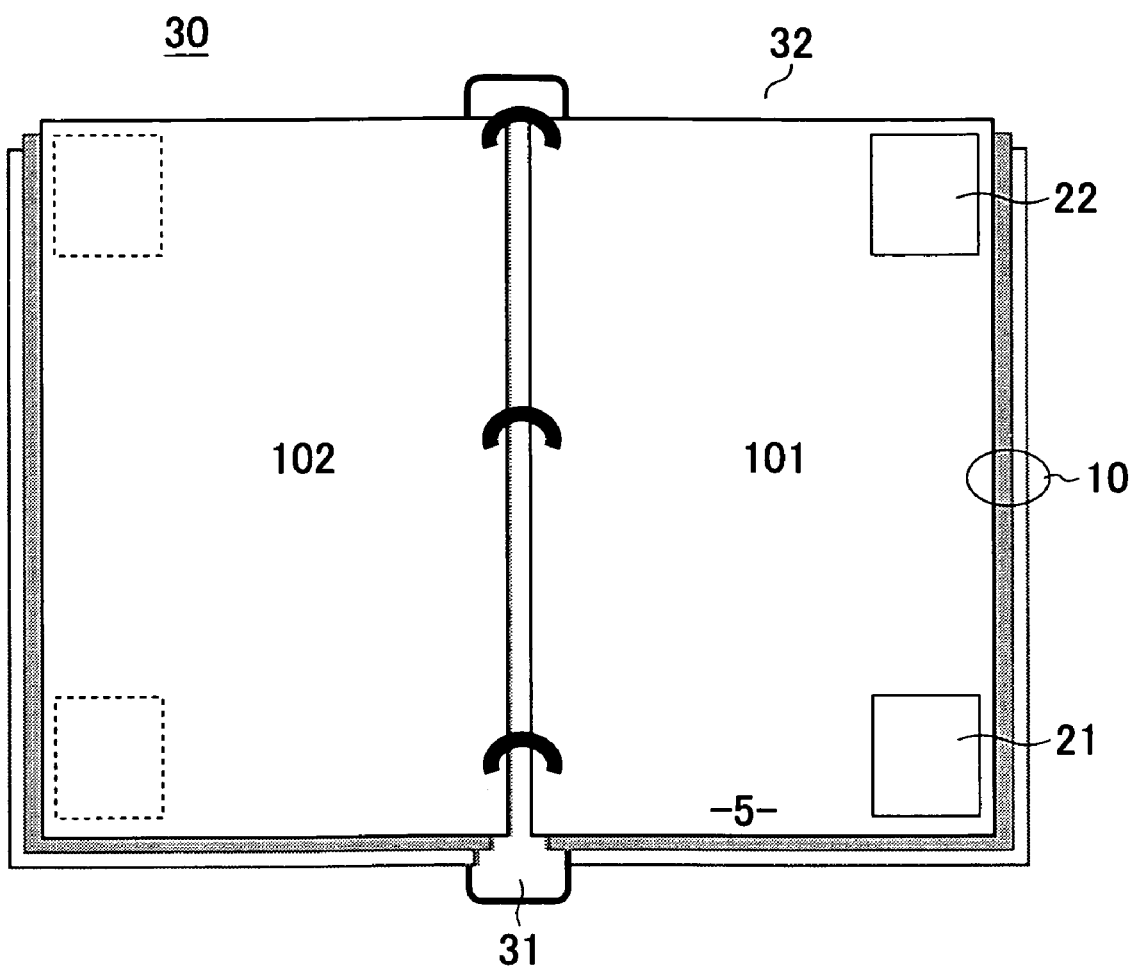
FIG. 5 shows the electronic book in an open configuration that has page numbers displayed in the bottom margin.

FIG. 5 shows a condition where the electronic book 30 has been opened. Like a traditional book, the page number is shown on each page in the upper or lower margin or in any of the four corners.

The sensors 21 and 22 are arranged on each of the pages of a plurality of pages (e.g., each of ten pages) of electronic paper 10. When it is opened as shown in FIG. 5, only the sensors of the electronic paper 101 which a user can directly see are validated. For example, each electronic paper generates a signal indicating whether the page is surface or back, and the controller 14 may determine, based on the number of the signals indicating the surface page, which page is currently visible. The operation of rewriting is only applied to the electronic paper that is currently visible.

When a user curves the sensor 21 in the lower right of the top page of the display portion 32 in the condition where the electronic book 30 shows information with page information, a voltage corresponding to the direction and quantity of the curve is generated in the sensor 21 and transferred to the controller 14. The controller 14 determines whether the voltage is equal to or greater than a predetermined value. In the case that the voltage is equal to or greater than the predetermined value, the controller 14 counts a continuous time that the voltage has been equal to or greater than the predetermined value. When the counted continuous time elapses over a predetermined time, the controller 14 determines that an instruction of a page increment has been entered. Further, the controller 14 calculates a speed of page update in accordance with the value of the detected voltage, and updates, in accordance with the calculated speed, information to be displayed on the display portion 32. Thereby, page information can be scrolled to an order direction.

Figure 6:
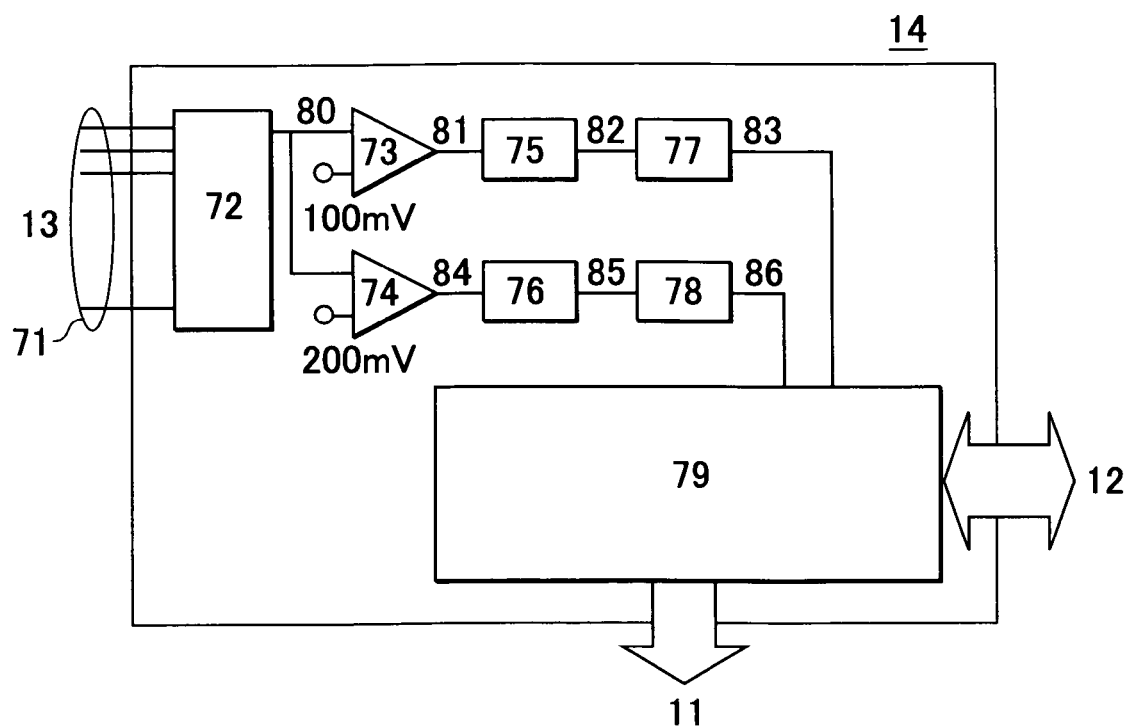
FIG. 6 is a block diagram showing an internal structure of the controller shown in FIG. 1.
Figure 7:
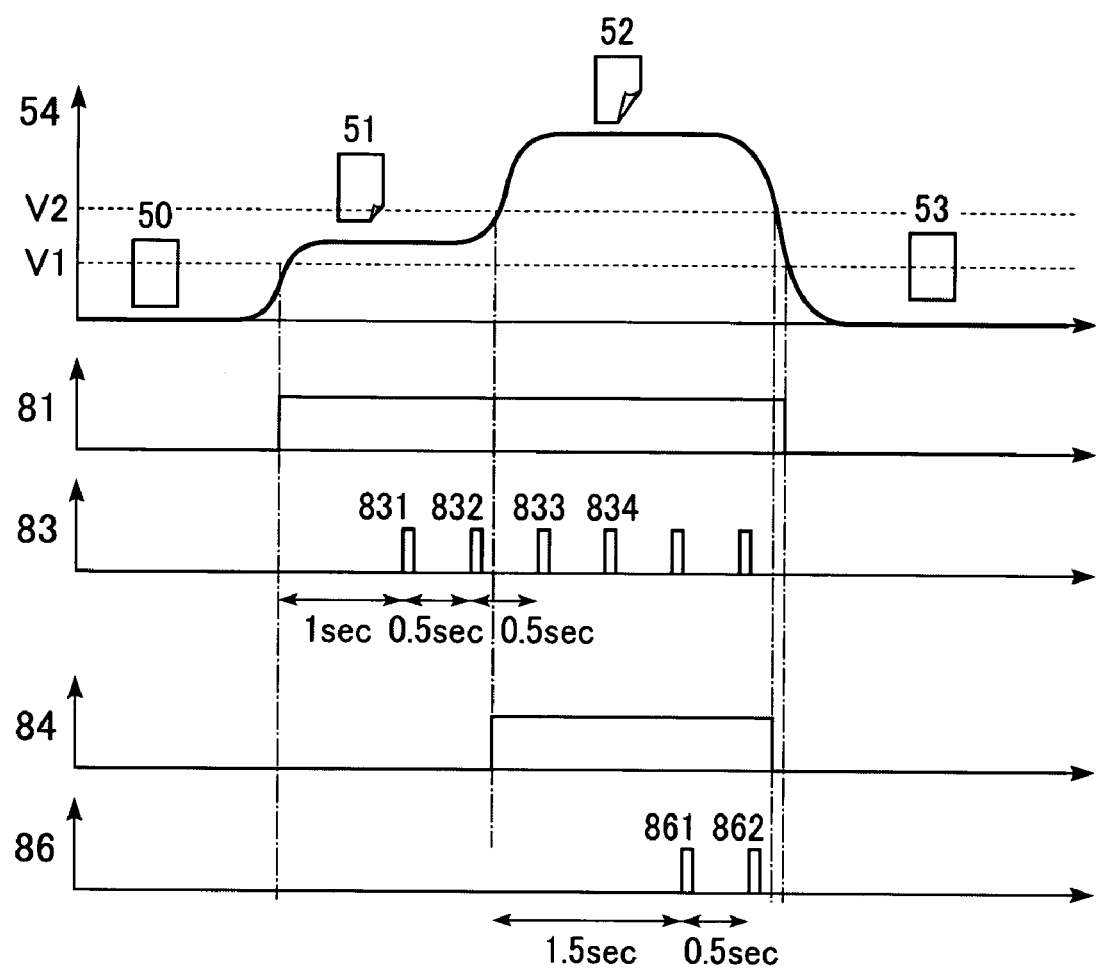
FIG. 7 shows an output signal from a sensor.

The operations are described in detail in reference to FIGS. 6 and 7.

FIG. 7 shows a sensor output 54, output signals 81 and 84 from first and second comparators, a page increment signal 83 at a normal speed and a page increment signal 86 at a high speed in the cases where it is changed from an initial condition 50 with no curve to a condition 51 with a slight curve, and/or to a condition 52 with further more curve, and/or to a condition 53 returned to the initial condition. The horizontal axis is time.

FIG. 6 is a block diagram showing an internal structure of the controller 14. The controller 14 receives signals 71 from each of the sensors 21 and 22 on each of the pages of the electronic papers 10, and includes an input buffer 72 outputting the signals from the validated sensors, the first and second comparators 73 and 74, first and second counters 75 and 76, first and second determination units 77 and 78 for determining page increment, and a display control unit 79.

A voltage output 80 of the validated sensor output from the input buffer 72 is input to the first comparator 73 and compared to a comparison value V1 (100 mV in FIG. 6). In the case where the curve (bending of the electronic page) exceeds a predetermined value, the sensor output 80 becomes larger than 100 mV, and thereby the output 81 of the first comparator 73 is changed from L (low) to H (high) and the signal is transferred to the first counter 75. At that time, the counter 75 starts to count and outputs a count value, i.e., a continuous time of the curved condition, to the first page increment determination unit 77. The page increment determination unit 77 generates a pulse 831 as a page increment signal 83 when the counter output 82 becomes a predetermined value (e.g., 1 sec.) and sends the pulse 831 to the display control unit 79. The display control unit 79 increments, based on the pulse 831, a page to be displayed, reads information of a new page from the memory 12, sends the page information to the display 11 and causes the display 11 to display the information of the new page.

In the case where the curved condition of the sensors 21 and 22 has been maintained, the counter 75 further keeps the counting operation. When a predetermined amount of time (e.g., 0.5 sec.) elapses after the initial page increment signal is generated, a next pulse 832 for a next page increment is generated, and thereby the display 11 is further updated. Then, pulses 833, 834 and so on are sequentially generated and the displayed page is updated in increments of 0.5 sec. elapsed time.

Based on the operation as described above, a user can see that a page is updated in the 0.5 sec. increments after he/she initially curves the sensors 21 and 22 and maintains the curve.

In the operations as described above, in the case where the user curves the sensors 21 and 22 a greater amount (e.g., curve 52 shown in FIG. 7), the sensor output 80 becomes larger than a second comparison value (200 mV in FIG. 7). In this case, the output 84 from the second comparator 74 is changed from L (low) to H (high), and a continuous time of the curve condition is counted by the second counter 76 and output as a count output 85. When a predetermined amount of time (e.g., 1.5 sec.) elapses, it is determined as the high speed page increment, and a pulse 861 for a high speed increment signal 86 is transferred to the display control unit 79. When the display control unit 79 receives the pulse 861, the page increment signals 83 are ignored and the high speed page increment signal is prioritized. Then, the display control unit 79 reads page information incremented with 10 pages from the memory 12 and sends the read page information to the display 11. Thereby the display 11 updates and displays the page incremented with the 10 pages. Then, the 10 pages increment is sequentially conducted based on pulses 862 and so on.

The high speed page increment may be modified as divided to three or more conditions with three or more comparison values and thereby provided an intermediate speed page increment operation.

The user stops maintaining the curve condition of the sensors 21 and 22 and returns the sensors 21 and 22 to the normal condition 53 when the target page is displayed. Thereby the sensor output 80 becomes below the comparison value, and the comparators outputs 81 and 84 are returned to L. The counters 75 and 76 are reset and the outputs are stopped. Because a pulse for page increment is not further generated, the displayed page information is maintained.

The determination for page increment may be based on only the quantity of the curve or the continuous time of the curve condition. Further, in the case where the electronic paper is curved to a reverse direction to a normal page increment of the traditional book, it may be arranged so as not to be determined as a page increment.

In the case where the page number is displayed in the same position as the sensor 21, the user can see the page number of a next page when to curve the sensor 21 and the user can continue the scrolling operation by seeing the page number until the page number reaches the target page number.

Further, it may be arranged so as to scroll the page information in a reverse direction by curving the sensor 22, or may be arranged so as to scroll the page information in a reverse direction based on a negative voltage generated by curving the sensors to a reverse direction.

In the above embodiments, the generated voltage by each sensor becomes low when to make the curvature of the sensor small, and thereby the page information is slowly scrolled. On the other hand, the generated voltage by each sensor becomes high when to make the curvature of the sensor large, and thereby the page information is quickly scrolled.

In the case where a user actually turns over the electronic paper and opens another electronic paper to look at another page of information, the sensor 21 or 22 is, also, curved. It, however, is distinguished from the page increment operation of the present embodiment as described above because the time required for the actual page turn over operation is less than 1 sec. In other words, the comparison time value for the initial page increment (1 sec. in the above description) is set to a longer time than the time required for the actual page turn over.

When the electronic paper 101 is later opened to a second page, the left page is the back of the previous electronic paper 102. In the case where the electronic paper can display page information on the back side of the paper, it is displayed of information of a page previous to the page to be displayed on the surface of the electronic paper 101 (right side).

Second Embodiment

Figure 4:
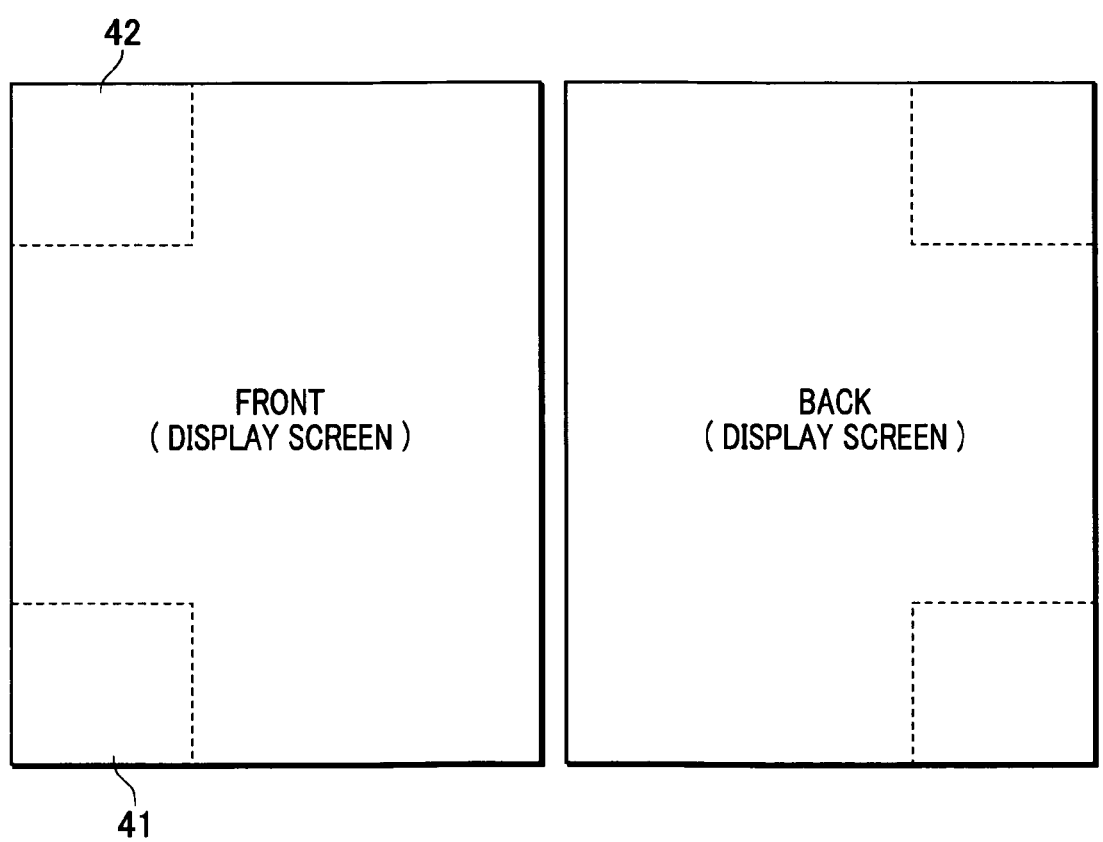
FIG. 4 is a view of a double-sided display of electronic paper of the present invention.

FIG. 4 shows electronic paper constituting a display of an information device according to a second embodiment of the present invention.

A manufacturing method for the electronic paper shown in FIG. 4 will now be described.

A pressure sensor formed of a polyvinylidene fluoride (PVDF) sheet is produced in a similar manner to that of the first embodiment.

The base material of the electronic paper is PET (polyethylene terephthalate) of 300 μm thickness. An ITO electrode is formed over the PET base material as a transparent electrode, and a polymer-dispersed double-frequency liquid crystal is sandwiched between the two layers, thereby producing liquid-crystal-display electronic paper capable of black-and-white display. Then, two sheets of the electronic paper are bonded with each other so that the back sides face each other with such pressure sensors as described above therebetween, thereby producing electronic paper capable of double-sided display. The pressure sensors are positioned at the corners, as indicated by reference numerals 41 and 42. A certain number of sheets of such electronic paper, for example, 20 sheets of electronic paper, are bound into an electronic book by connecting a display portion 11 to a file portion 31 that houses a sensor 13 and a controller 14.

When the sensor 41 portion is bent in a state where display of information having page information is spread across double pages of the electronic book, the page information can be scrolled forward. In this case, when the sensor 42 portion is bent, the page information can be scrolled backward. The scrolling speed can increase by continuously bending each sensor portion, and the pages can thus be efficiently updated. Accordingly, a flexible electronic book having a user interface that provides realistic feeling can be realized.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An information device comprising:
    a flexible display unit capable of displaying information having page information in units of pages;
    a detection unit configured to detect at least one of a bending direction, an amount of bending, and a duration that the display unit is bent; and
    a scroll determination unit configured to determine whether page scrolling has been input based on the detected at least one of the bending direction, the amount of bending, and the duration that the flexible display unit is bent, and for updating the information output on the display unit when it is determined that page scrolling has been input,
    wherein it is determined that page scrolling has not been input when the bending direction is opposite a predetermined direction.

2. A method for displaying information on an information device displaying electronic pages on a flexible display unit, the method comprising:
    determining page information to be displayed;
    displaying the page information on the flexible display unit;
    accepting user input;
    determining if the user input is a scroll request based on at least one of a bending direction, an amount of bending, and a duration that the flexible display unit is bent;
    if the user input is a scroll request, determining new page information to be displayed based on the scroll request; and
    displaying the new page information on the flexible display unit,
    wherein if the bending direction is opposite a predetermined direction, it is determined that the user input is not a scroll request.

* * * * *